UNITED STATES PATENT OFFICE.

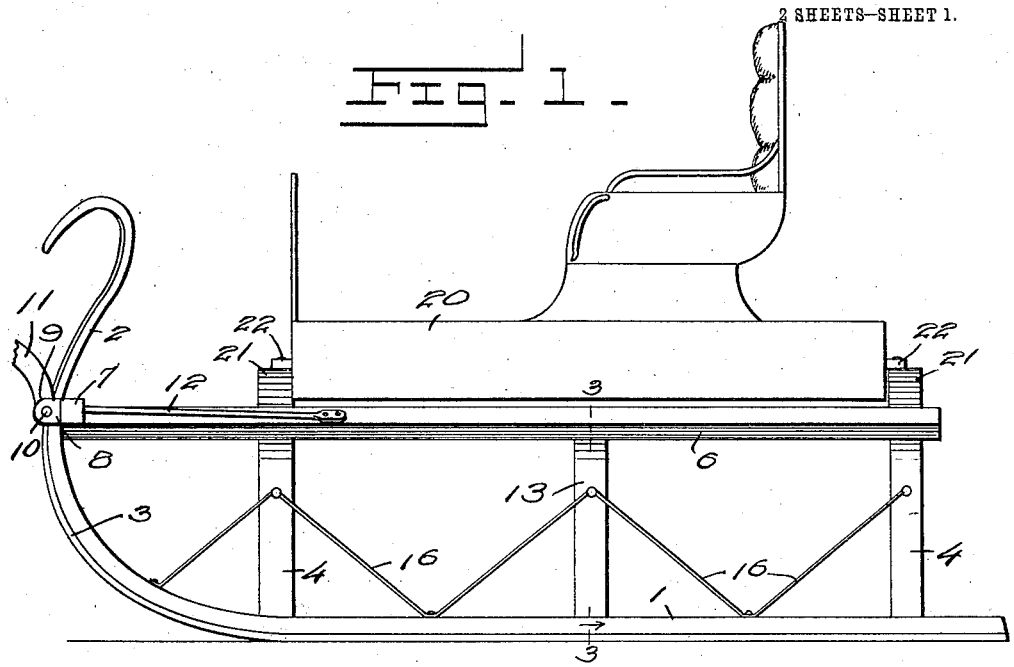
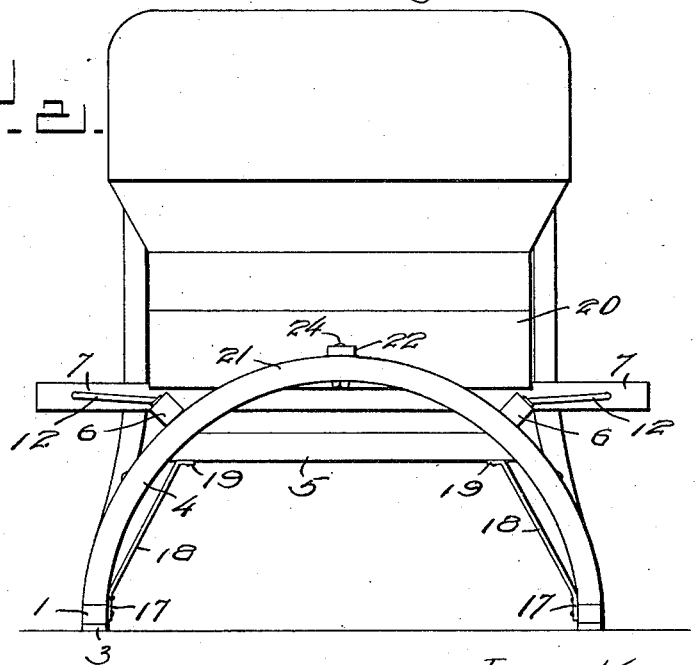

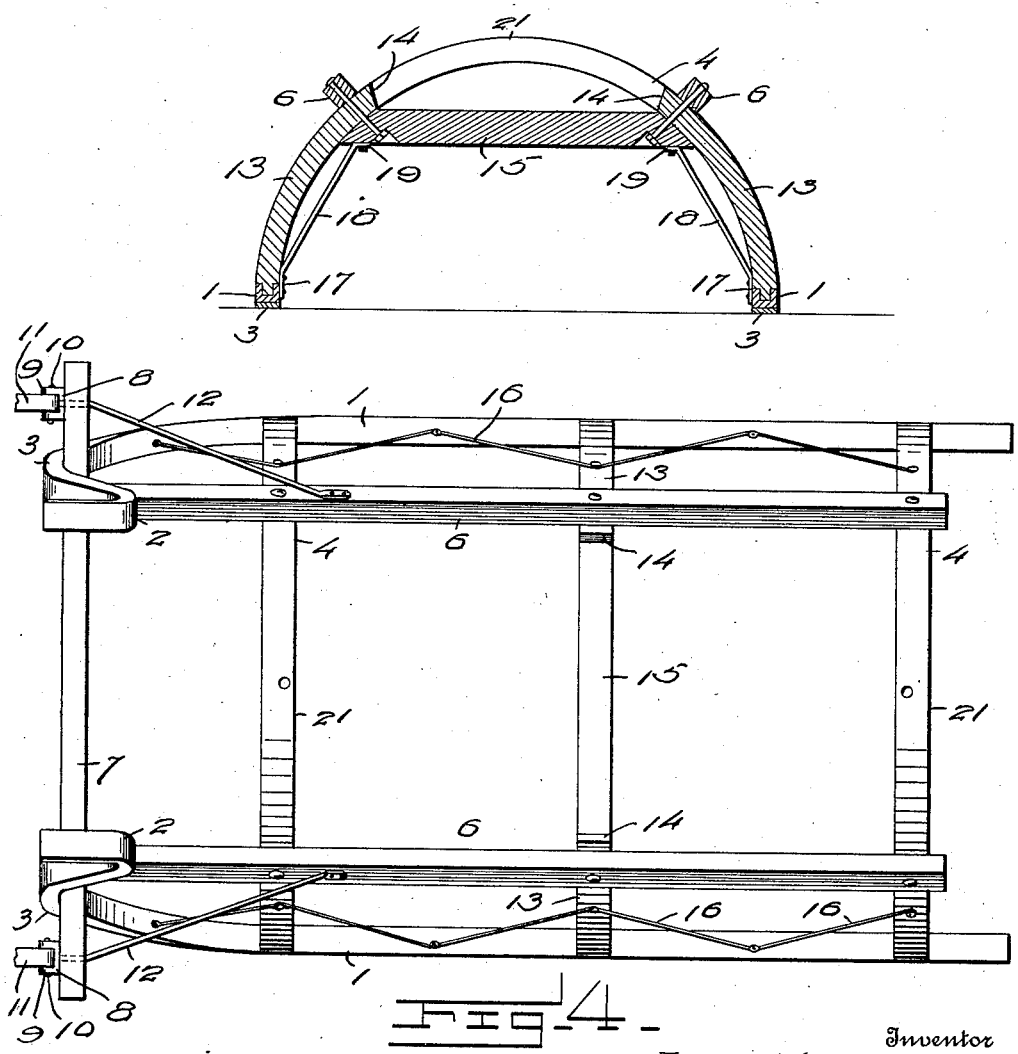

LEROY KENNARD, OF SHARPSBURG, OHIO.

VEHICLE.

1,065,876.  Specification of Letters Patent.  Patented June 24, 1913.

Application filed August 8, 1911, Serial No. 642,954.  Renewed November 19, 1912.  Serial No. 732,344.

*To all whom it may concern:*

Be it known that I, LEROY KENNARD, a citizen of the United States, residing at Sharpsburg, in the county of Athens and State of Ohio, have invented certain new and useful Improvements in Vehicles, of which the following is a specification.

My invention relates to improvements in vehicles, and has particular reference to an improved form of runner attachment which may be readily secured to the body of an ordinary wagon or buggy.

The leading object of my invention is the provision of an improved sleigh or runner body which will be of such construction as to readily receive and to firmly engage the body of a vehicle and permit of the ready attachment or removal of the body as desired.

Other objects and advantages of my improved runner attachment for vehicles will be readily apparent by reference to the following description taken in connection with the accompanying drawings, and it will be understood that I may make any modifications in the specific structure shown and described within the scope of my claims without departing from or exceeding the spirit of the invention.

Figure 1 represents a side elevation of a vehicle having my improved runner attachment secured thereto. Fig. 2 represents a rear view of the invention as illustrated in Fig. 1. Fig. 3 represents a sectional view on the line 3—3 of Fig. 1, and Fig. 4 represents a top plan view of my sleigh or runner with a vehicle body removed therefrom.

In the drawings, the numeral 1 designates the runners of my vehicle, said runners having the forward upwardly curving goose neck portion 2 and being faced with the usual runner plates 3. Mortised in the runner portions 1 are the lower ends of the front and rear arched braces 4 which serve to provide both knees for the runner body and also to provide central bracing arch portions. Transverse braces 5 have their ends secured to the said arch braces 4 and extend thereacross to form a bracing chord. Secured exteriorly to the said braces 4 and disposed slightly above the upper face of the cross braces 5 of my invention are the longitudinally extending braces or raves 6, while secured to the forward end of the said raves 6 and to the goose necks 2 of the runners is the cross bar 7 having its ends projecting laterally outward beyond the outer line of the runner. Secured to the said brace 7 at each end thereof is the plate 8 having the forwardly extending ears 9 between which are pivoted by the bolt 10 the rear ends of the thills 11. To brace the said thills and cross bar 7, I secure to the raves 6 the brace rods 12 which extend forward and have their forward ends extending through and secured to the plate 8, whereby the pull of the thills is directed both against the cross bar 7 and also against the said braces 12 which serve to take up a portion of the said pull and prevent undue strain against the cross bar 7.

Secured centrally to each of the runners 1 and rising therefrom are the knees 13 which extend upward just above the raves 6 and have vertical inner faces 14, while secured to the said knees 13 and connecting the same is the transversely extending cross bar 15. Connecting the various knees and arch braces on each side are the brace rods 16 for strengthening the same, while to prevent inward buckling of the knees and arches, I secure to the runners 1 the plates 17 having the tubular upwardly projecting brace portions 18 terminating in inwardly bent plate portions 19 which are secured to the under faces of the transverse braces 5 and 15 and serve to aid in supporting the said braces. It will thus be seen that my entire structure is firmly braced to satisfactorily and securely support a vehicle body and avoid all liability of disintegration or spreading of the parts, I thus having provided a thoroughly strong and satisfactory structure for the desired purpose.

In the use of my invention, I mount the vehicle body 20 to rest upon the transverse brace 15 and lie between the arch portions 21 of the members 4 above the braces 5 thereof. It will thus be seen that said arch portions 21 serve to satisfactorily limit longitudinal movement of the vehicle body upon the runner body, while to further aid in preventing said movement and also to secure the vehicle body firmly in position, I secure the hanger irons or spring supporting cross bars 22 of the vehicle to said arch portions 21 by the bolts 24 which pass downward through the hanger irons and through the said arch portions.

From the foregoing description taken in connection with the accompanying drawings the construction of my improved runner attachment for vehicles will be readily understood, and it will be seen that on account of the position of the raves and the upper ends of the knees 13 the raves and the vertical faces 14 of the said knees will bear against the sides of a vehicle body and will absolutely prevent accidental lateral movement thereof, and the portions 21 of the arch braces 4 on account of their position and also on account of having the hanger irons secured thereto will absolutely prevent longitudinal movement of the vehicle body, said portions 21 arching upward above the bottom of the vehicle body, as most clearly shown in Figs. 2 and 3.

It will thus be seen that I have provided a thoroughly simple, practical and efficient sleigh attachment for vehicle bodies which will be of simple and inexpensive construction and which will serve to most firmly and securely retain body in position to prevent accidental loosening thereof.

I claim:

1. A sleigh attachment for vehicles, comprising runners, arches secured to and connecting the runners near the front and rear ends thereof, longitudinally extending raves secured to the arches, knees secured to and curving inward from the runners near the central portion thereof, cross braces connecting the sides of the arches and the knees, a transverse brace connecting the raves and having portions secured to the runners, and thill attaching plates secured to the ends of said transverse brace, the position of the front and rear arch members being such that the body of the vehicle will fit down therebetween and will absolutely prevent longitudinal movement of the sleigh attachment relative to said body.

2. A sleigh attachment for vehicles, comprising runners, a plurality of arch members connecting the two runners, raves and braces connecting the runners and the various arch members, transverse braces connecting the sides of the arch members, and the central arch members having the arches thereof cut away to provide knees, whereby the vehicle body will fit down between the upper ends of the knees provided by cutting away the center of the arch, while the arch members at the end will engage the ends of the vehicle body to prevent longitudinal movement of the vehicle body with respect to the sleigh attachment, and the ends of the knees will engage the sides of the vehicle body and prevent lateral movement thereof.

In testimony whereof I affix my signature, in the presence of two witnesses.

LEROY KENNARD.

Witnesses:
T. S. SPURRIER,
GEO. ZIMMERMAN.

---

Copies of this patent may be obtained for five cents each, by addressing the "Commissioner of Patents, Washington, D. C."